(12) United States Patent
Ortega et al.

(10) Patent No.: US 6,564,213 B1
(45) Date of Patent: May 13, 2003

(54) SEARCH QUERY AUTOCOMPLETION (75) Inventors: Ruben E. Ortega, Seattle, WA (US); John W. Avery, Seattle, WA (US); Robert Frederick, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/551,787

(22) Filed: Apr. 18, 2000

(51) Int. Cl.⁷ .............................................. G06F 17/30
(52) U.S. Cl. ................... 707/5; 707/3; 707/4
(58) Field of Search ............... 707/1–10, 100, 707/102, 104

(56) References Cited

U.S. PATENT DOCUMENTS

| | | | |
|---|---|---|---|
| 5,675,819 A | | 10/1997 | Schuetze ..................... 704/10 |
| 5,826,240 A | * | 10/1998 | Brockman et al. ............ 705/11 |
| 5,845,300 A | * | 12/1998 | Comer et al. ................ 707/508 |
| 5,864,805 A | * | 1/1999 | Chen et al. .................. 704/235 |
| 5,897,622 A | * | 4/1999 | Blinn et al. .................. 705/26 |
| 5,995,928 A | | 11/1999 | Nguyen et al. ............. 704/251 |
| 6,006,225 A | * | 12/1999 | Bowman et al. ................ 707/5 |
| 6,029,141 A | * | 2/2000 | Bezos et al. .................. 705/27 |
| 6,144,958 A | * | 11/2000 | Ortega et al. ................... 707/5 |
| 6,169,986 B1 | * | 1/2001 | Bowman et al. ................ 707/5 |
| 6,185,558 B1 | * | 2/2001 | Bowman et al. ................ 707/5 |
| 6,208,339 B1 | * | 3/2001 | Atlas et al. .................. 345/780 |
| 6,223,059 B1 | | 4/2001 | Haestrup ..................... 455/566 |
| 6,230,173 B1 | * | 5/2001 | Ferrel et al. ................. 707/513 |
| 6,266,665 B1 | * | 7/2001 | Vaidyanathan et al. ......... 707/7 |
| 6,307,549 B1 | | 10/2001 | King et al. .................. 345/810 |
| 6,370,527 B1 | * | 4/2002 | Singhal ......................... 707/6 |
| 6,374,241 B1 | * | 4/2002 | Lamburt et al. ................ 707/6 |
| 6,377,965 B1 | * | 4/2002 | Hachamovitch et al. .... 707/534 |
| 6,392,640 B1 | | 5/2002 | Will .............................. 345/184 |
| 6,401,084 B1 | * | 6/2002 | Ortega et al. ................... 707/2 |
| 6,401,085 B1 | * | 6/2002 | Gershman et al. ............. 707/4 |
| 6,421,675 B1 | | 7/2002 | Ryan et al. .................. 707/100 |
| 6,430,553 B1 | * | 8/2002 | Ferret ............................ 707/3 |
| 6,466,918 B1 | * | 10/2002 | Spiegel et al. ................ 705/27 |
| 6,489,968 B1 | * | 12/2002 | Ortega et al. ................ 345/713 |

FOREIGN PATENT DOCUMENTS

WO      WO 99/45487      9/1999

OTHER PUBLICATIONS

User's Guide for TextPlus V3.3 for the Palm OS; printed from Smartcell.com web site on Dec. 17, 1999 (12 pages).
Description of TextPlus for Palm Version 3.3 printed from Palmgear.com web site on Dec. 17, 1999 (3 pages).

(List continued on next page.)

*Primary Examiner*—Hosain T. Alam
*Assistant Examiner*—Anh Ly
(74) *Attorney, Agent, or Firm*—Knobbe, Martens, Olson & Bear LLP (57) ABSTRACT

A system for facilitating online searches suggests query autocompletion strings (terms and/or phrases) to users during the query entry process, wherein the suggested strings are based on specific attributes of the particular database access system being searched. A string extraction component associated with a database access system, such as a web site of an online merchant, periodically generates a dataset that contains the autocompletion strings for the system. The datasets are preferably biased to favor the database items that are currently the most popular (e.g., best selling or most frequently viewed), and may be customized to particular users or user groups. The datasets are transmitted to users' computing devices, which may include handheld and other wireless devices that lack a full keyboard. An autocompletion client which runs on the computing devices in association with a browser uses the datasets to suggest the autocompletion strings as users enter queries that are directed to the database access system.

56 Claims, 6 Drawing Sheets

OTHER PUBLICATIONS

Jakobsson, M. "Autocompletion in Full Text Transaction Entry: A Method for Humanized Input," Conference Proceedings on Human Factors in Computing Systems, pp. 327–332, dated Apr., 1986.

Housel, B. and Lindquist, D. "WebExpress: A System for Optimizing Web Browsing in a Wireless Environment," Proceedings of the Second Annual Internat. Conf. on Mobile Computing and Networking, pp. 108–116, dated Nov. 1996.

Chang, H., Tait, C. Cohen, N., Shapiro, M., Mastrianni, S., Floyd, R., Housel, B. and Lindquist, D. "Web browsing in a wireless environment: disconnected and asynchronous operation in ARTour Web Express," Proceedings of the Third Annual ACM/IEEE Internat. Conf. on Mobile Computing and Networking, pp. 260–269, dated Sep. 1997.

Gessler, S. and Kotulla, A. "PDAs as mobile WWW browsers," Computer Networks and ISDN Systems 28, pp. 53–59 (1995).

* cited by examiner

SEARCH QUERY AUTOCOMPLETION

FIELD OF THE INVENTION

The present invention relates to methods for assisting users in efficiently entering search queries.

BACKGROUND OF THE INVENTION

A variety of techniques have been developed for reducing the amount of time and effort needed for search engine users to locate desired items within large domains of items. One such technique, which is described in published international patent application WO 99/45487 assigned to Amazon.com, Inc., involves ranking the search result items for display based on the frequencies with which users of the system have selected the items. With this method, the most frequently accessed items among a population of users tend to be displayed near the top of the search results list, reducing the need for the searcher to scroll through long lists of search results.

Another technique, which may be invoked when a search query produces a large number of hits, involves suggesting related terms to add to the query. One such method, which is described in U.S. Pat. No. 6,006,225 assigned to Amazon.com, Inc., involves suggesting the terms that have appeared in combination with the submitted term(s) the most frequently in recent, successful query submissions. For example, if the user submits the book search "thin air" and obtains a long list of matching titles, the search system may suggest adding "into" to the query based on the high frequency with which other users have recently submitted the query "into thin air." As with the search result ranking method described above, this method tends to direct the searcher to the items that are currently the most popular among the population of users. Other known techniques for assisting users in conducting searches include (a) displaying to the user search queries being submitted by other users (implemented by the Metaspy™ service of the Metacrawler.com web site), and (b) providing links for the most popular searches of the day on the site (implemented by the Altavista web site).

It is also known in the art to provide an autocompletion tool that suggests completed text strings to the user as the user enters text. For example, Microsoft's Internet Explorer browser automatically suggests completed URLs as the user enters text in the URL field; and the TextPlus™ for Palm tool suggests autocompletion words and phases (based on frequency of use) as users enter text within Palm Pilot™ applications. These tools generally operate based on text strings that have previously been entered on the particular PC, Palm Pilot, or other computing device. As a result, the tools generally are not helpful when the user enters a new term or phrase.

One problem that is not fully addressed by the above and other known methods is that of reducing the number of keystrokes, voice commands, or other actions needed to enter a search query for searching a particular catalog or database, such as the products database of on online merchant. This problem is particularly important to users of handheld and other wireless computing devices that do not include full keyboards. The present invention seeks to address this problem.

SUMMARY OF THE INVENTION

The present invention overcomes the above and other problems by suggesting autocompletion strings (terms and/or phrases) to users during the query entry process, wherein the suggested strings are based on specific attributes of the particular database access system being searched. In accordance with the invention, a string extraction component associated with a particular database access system, such as a web site of an online merchant, periodically generates a dataset that contains the autocompletion strings (terms and/or phrases) for the system. The datasets are transmitted to users' computing devices, which may include handheld and other wireless devices that lack a full keyboard.

An autocompletion client which runs on the computing devices in association with a browser uses the datasets to suggest autocompletion strings as users enter queries that are directed to the database access system. Because the autocompletion strings are not based solely on strings entered on the particular computing device, they tend to be helpful for entering both new and previously entered text strings. The invention may be used regardless of the particular text input method used (stylus/graffiti, voice, keyboard, etc.).

The datasets are preferably generated so as to favor the items and/or search strings that are currently the most popular. For example, if Pokemon toys are currently the best selling or most-frequently-searched-for items within the database, the term POKEMON may be suggested whenever a user enters the letters "PO," even though many hundreds of other items in the database may start with "PO." In one embodiment, the datasets are generated periodically at least in part by extracting the search terms and phrases that have appeared the most frequently within successful search queries within a selected period of time, such as the last X days. In another embodiment, the autocompletion strings are periodically extracted from database descriptions of the most popular items within the database (e.g., the best selling or most frequently accessed items over a selected window of time). The datasets may also be customized to particular users or user groups. In one embodiment of the autocompletion client, the user can submit a suggested autocompletion string as the query with a single action, such as clicking or tapping on the string.

An important benefit of the invention—particularly for users of wireless computing devices—is that it significantly reduces the number of keystrokes, voice commands, or other actions needed to enter a query. Another benefit, in certain embodiments, is that the suggested strings strongly reflect the browsing activities, and thus the item interests, of a population of users. Another benefit, which is inherent in the preferred methods for generating the datasets, is that the suggested search strings do not produce a null query result.

BRIEF DESCRIPTION OF THE DRAWINGS

Throughout the drawings, like reference numbers are used to reference items that are identical or functionally similar.

DETAILED DESCRIPTION OF THE PREFERRED EMBODIMENTS

The present invention provides a system and associated methods for suggesting autocompletion strings to users during entry of search queries. The autocompletion strings are based on one or more attributes of the particular database system being searched, such as the identities of the items contained within the database, frequencies with which users have performed particular actions with respect to such items, and/or queries submitted by users to search the database. As a result, the suggestions tend to be helpful to the query entry process. The invention is particularly useful with computers that lack a full keyboard, such as handheld computing devices, cellular telephones, automobile computers and wearable computers, but may also be used with PCs and other computing devices that have full keyboards. The invention may be used with any of a variety of text entry methods, including but not limited to handwriting recognition (e.g., graffiti), voice recognition, and keyboard entry.

For purposes of illustration, the invention will be described primarily in the context of web-based systems and systems for searching catalogs of online merchants. It will be recognized, however, that the invention is not so limited.

Figure 1:
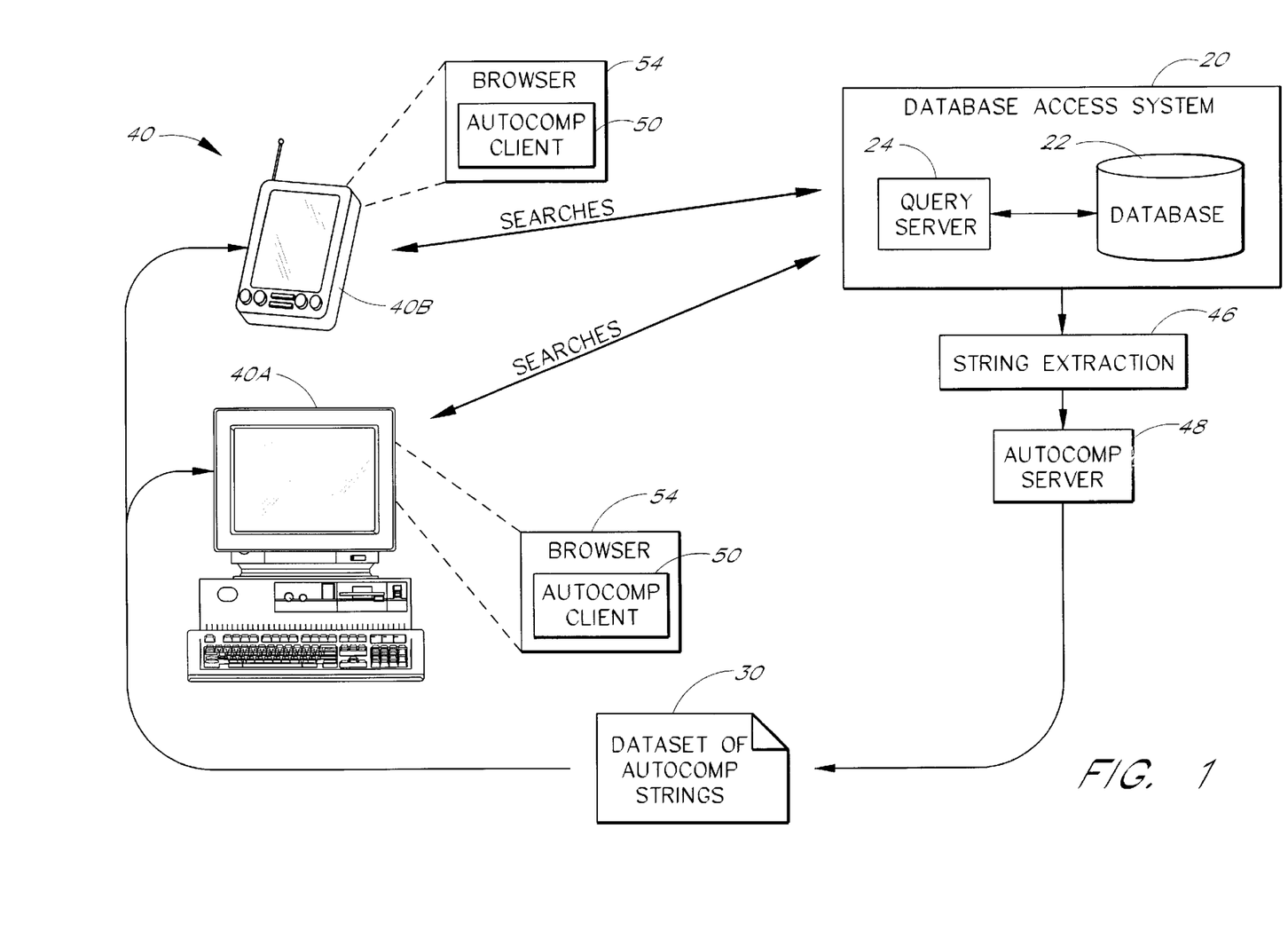
FIG. 1 illustrates the basic components and process flow of a system that embodies the invention.

FIG. 1 illustrates the basic components and process flow of a preferred embodiment of the invention. A database access system 20 includes a database 22 and a query server 24. The database 22, which may be any type of data repository or combination of data repositories, stores records or other representations of items. The items may, for example, be products that are available for sale, web pages that have been indexed by a crawler program, or businesses. For convenience, the term "item" will be used to refer interchangeably to the items themselves and to the database representations of such items.

The query server 24 provides functionality for remote users to search the database 22 for desired items using textual queries. The database access system 20 may also provide alternative methods for locating items within the database, such as a browse tree or an item recommendation service.

As depicted in FIG. 1, searches may be performed using a variety of different types of computing devices 40, such as a conventional PC 40A, or a handheld (wireless) computing device 40B that lacks a full keyboard (e.g., does not have fixed keys for the characters A–Z). The handheld computing device 40B may be a PDA (personal digital assistant) such as a Palm Pilot device, or may be a cellular telephone that includes Internet browsing capabilities. Typically, such handheld devices provide an interface for entering text using handwriting recognition and/or voice recognition The components associated with the query autocompletion function include a string extraction component 46, an autocompletion server 48, and an autocompletion client 50. The autocompletion client 50 runs in association with a browser 54, and is responsible for suggesting autocompletion strings to users during entry of search queries that correspond to (e.g., are entered into a search page of) the database access system 20. In one embodiment, the autocompletion client 50 is implemented as a browser plug-in that can be downloaded from the database access system 20 to assist users in the searching process. Alternatively, the autocompletion client may be provided as an integral component of the browser 54. The user interface provided by the autocompletion client is preferably dependent upon the type of computing device (PC, handheld, voice-activated, etc.) being used.

Figure 3:
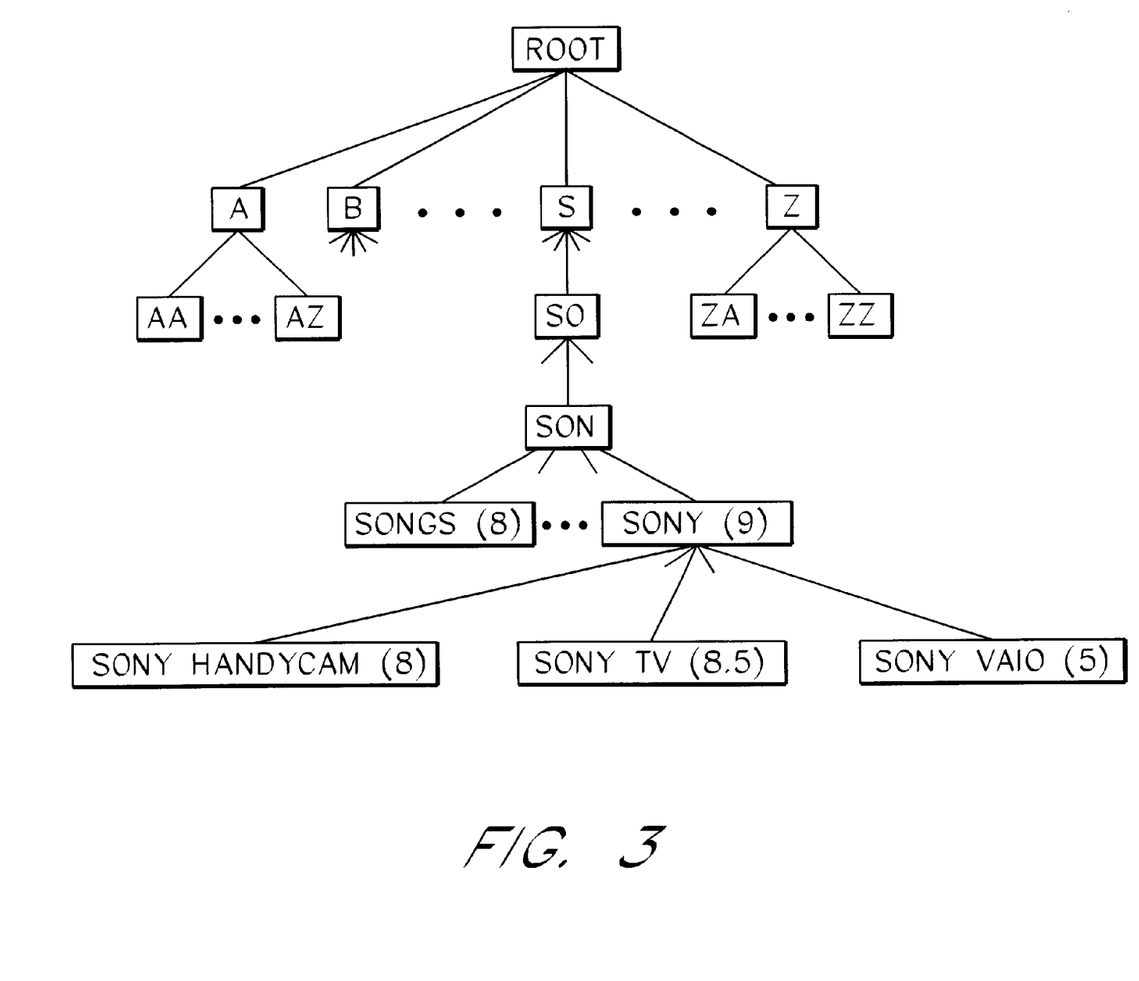
FIG. 3 illustrates the general form of a trie search tree that may be used to rapidly look up autocompletion strings.
Figure 4:
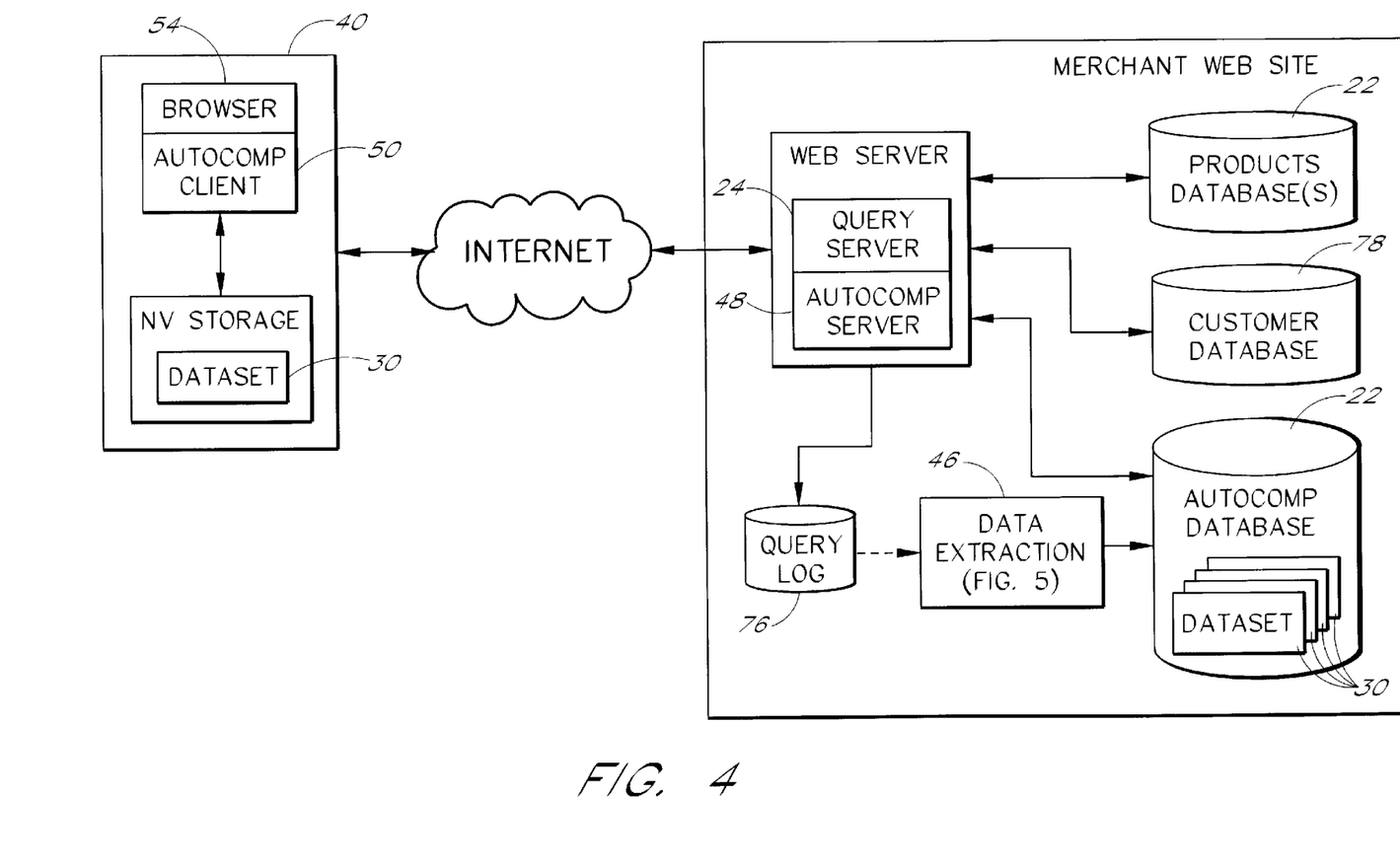
FIG. 4 illustrates one embodiment of the system shown in FIG. 1.
Figure 5:
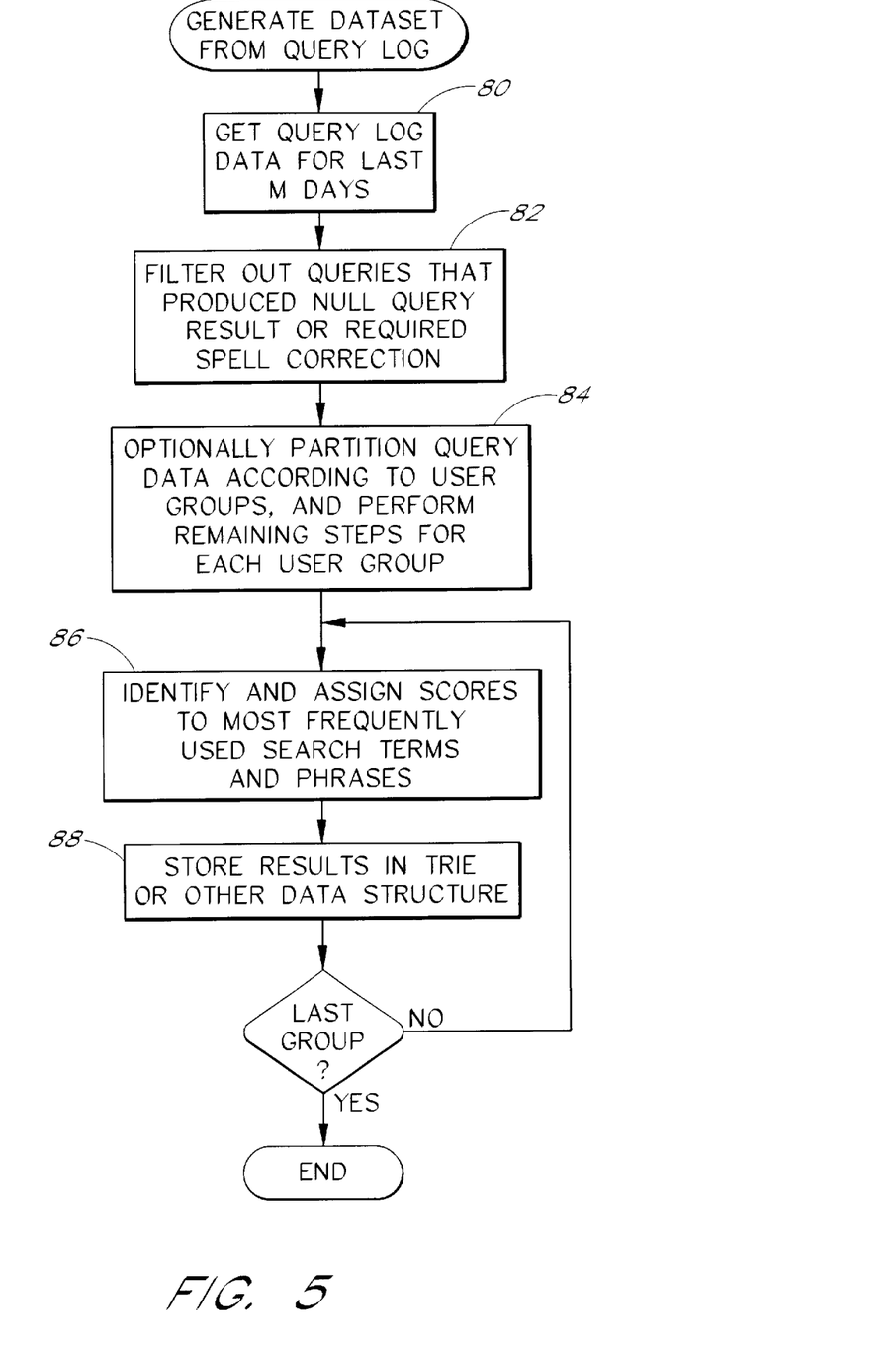
FIG. 5 illustrates a method for extracting autocompletion strings from a query log.
Figure 6:
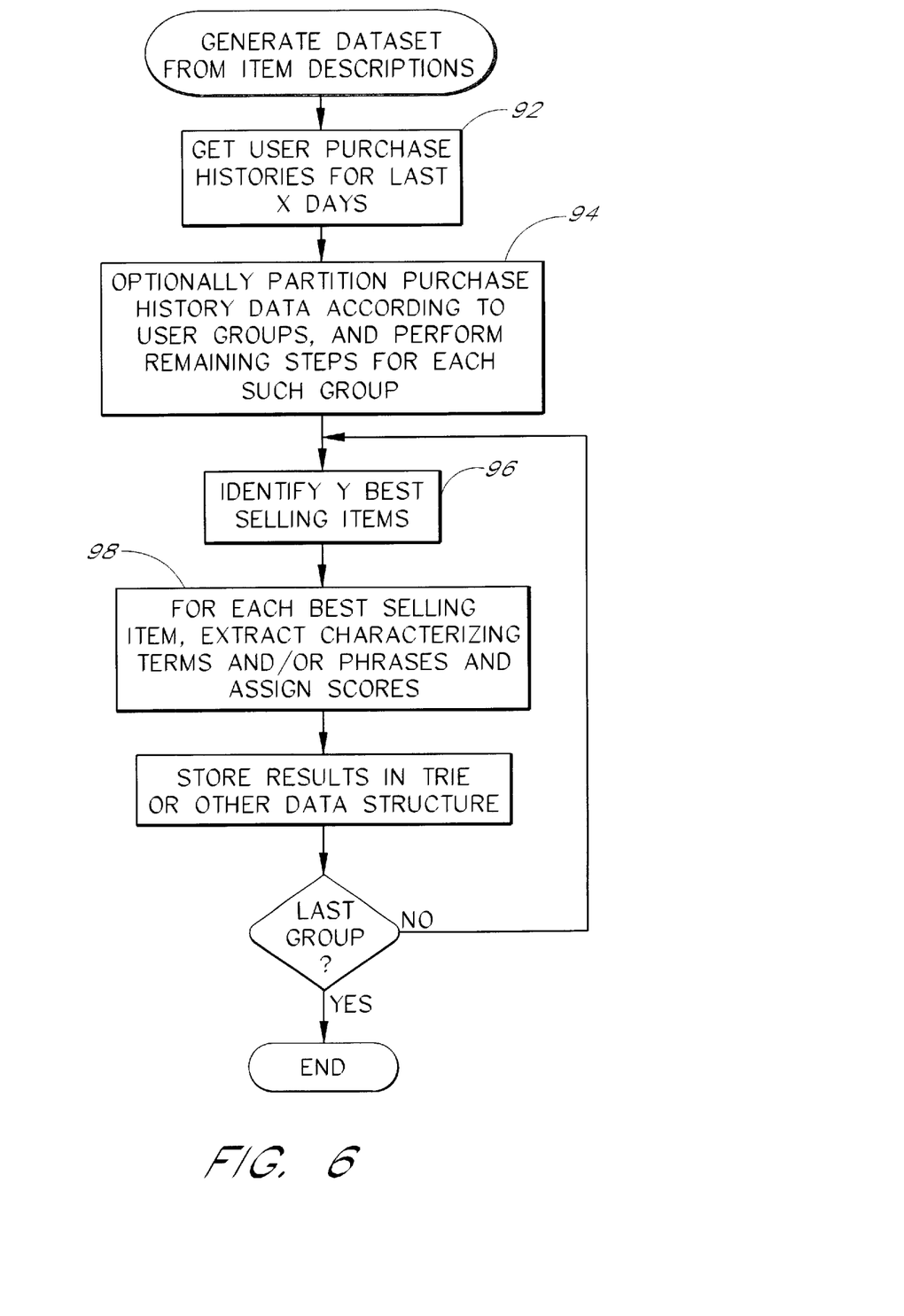
FIG. 6 illustrates a method for extracting autocompletion strings from item descriptions according to item sales histories.

The string extraction component 46 is responsible for periodically generating one or more datasets 30 that contain autocompletion strings (terms and/or phrases) that describe items within the database 22. The autocompletion strings are preferably extracted from a log of query submissions (as illustrated in FIGS. 4 and 5) and/or from the item descriptions within the database 22 (as illustrated in FIG. 6), although other sources of information could be used such as customer reviews or manufacturers' databases. As illustrated in FIG. 3 and described below, each dataset 30 is preferably in the form of a data structure, such as a trie, that is adapted to be rapidly searched by the autocompletion client 50. String scores or weights may be included in this data structure to favor certain strings over others.

If the database 22 is large (e.g., over one million items), the dataset generation task is preferably performed such that the autocompletion strings suggested generally correspond to the items and/or the search stings that are currently the most "popular." For example, if Pokemon products are currently the best selling items within the database 22, the term POKEMON may be suggested whenever a user enters the letters "PO," even though many hundreds of other items in the database may have names that start with "PO." One method for achieving this goal is to monitor the browsing (and if applicable, purchasing) activities of users to identify the most popular items, and to then parse such items to identify characterizing terms and/or phrases. FIG. 6 provides one example of this method. Another method, which is illustrated in FIGS. 4 and 5 and described below, involves monitoring query submissions over time to identify the most frequently used search terms and/or phrases. As discussed below, the datasets 30 may optionally be customized to particular users and/or groups of users.

As depicted in FIG. 1, the autocompletion server 48 dispatches the datasets 30 generated by the string extraction component 46 to the computing devices 40, which in-turn store the data structures (preferably in nonvolatile storage over multiple sessions) for subsequent use. Any of a variety of methods may be used for controlling the timing for such data transfers. For example, using the autocompletion client 50, the user may be able to manually initiate a transfer of the latest dataset, or to set up parameters for the automatic background downloading of new datasets. The frequency with which new datasets are made available for downloading may be dependent upon the frequency with which updates are made to database 22. For example, an online merchant that frequently adds new products to its online catalog may wish to generate new datasets on a relatively frequent basis (e.g., once per day) using a sliding window approach. Rather than sending the entire dataset 30 each time, the autocompletion server 48 could simply dispatch updates to previously downloaded datasets.

Information about the format and addresses of the relevant search pages may also be periodically sent to the computing devices 40. The autocompletion client 50 may then use this information to identify the web pages and associated search fields to which the autocompletion function should be applied. The information about the search pages could alternatively be "hard coded" within the autocompletion client 50.

An alternative approach that may be desirable with relatively small datasets 30 is to transmit the dataset to the computing device 40 with the corresponding web page. With this approach, the autocompletion strings may be customized to the particular search functionality provided on the web page. For example, for a book search page, the strings would correspond to book titles within the database 22, and for a music search page, the strings would correspond to music titles. A further variation is to transmit the autocompletion client 50 with corresponding search pages as a Java applet.

The autocompletion client 50 may be configured to provide autocompletion functionality for multiple, distinct database access systems 20 (e.g., the webs sites of several different online merchants). In such implementations, the user may download and store the datasets 30 associated with each such database access system the user wishes to browse. Alternatively, the autocompletion client 50 may be uniquely associated with a particular database access system.

The tasks of generating and disseminating the autocompletion datasets 30 could be offloaded in-whole or in-part by the operator(s) of the database access system(s) to a separate business entity. For example, a single business entity could perform the string extraction task for multiple online merchants under contract, in which case the extracted strings for merchants in similar business areas could optionally be combined within a single dataset. The same business entity could provide a service for disseminating the datasets to users.

Figure 2A:
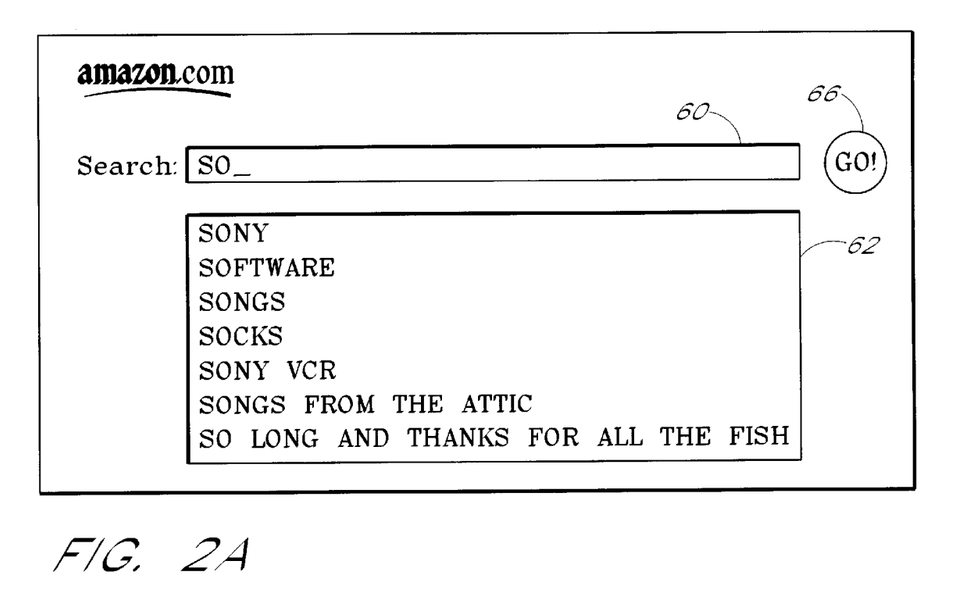
FIGS. 2(a) and 2(b) illustrate an example user interface that may be used to suggest autocompletion strings.
Figure 2B:
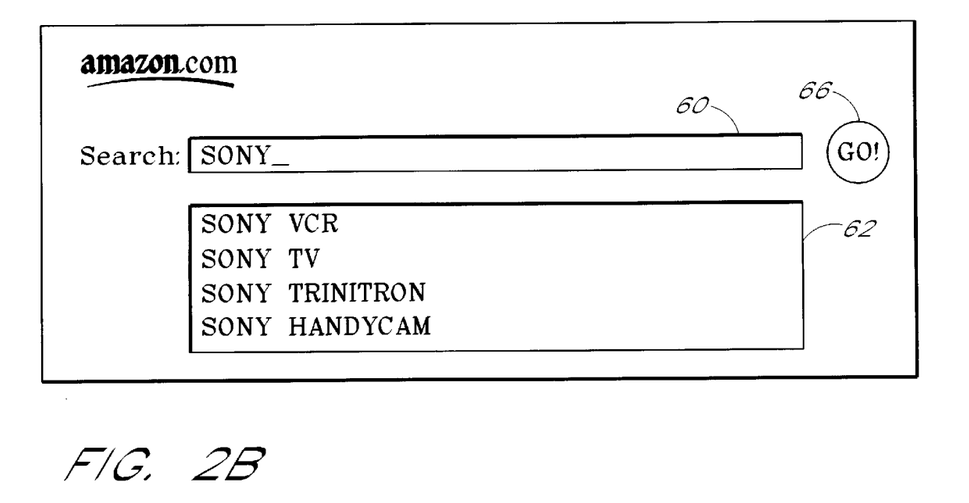

FIGS. 2(*a*) and 2(*b*) illustrate the general form of a user interface that may be used by the autocompletion client 50 for both PCs and handheld computing devices. In this example, as the user enters a search query into a search field 60 of the Amazon.com web site (by voice, stylus, etc.), the autocompletion client displays suggested autocompletion terms and phrases in a drop-down box 62. As illustrated in FIG. 2(*a*), terms are displayed in an upper pane of the box and phrases are displayed in a lower pane of the box. In other implementations, the autocompletion client may only suggest one type of string (terms or phrases) without the other. As illustrated in FIG. 2(*b*), once the user has completed a term, the autocompletion client may only display suggested phrases.

The user interface may implement one or more methods for the user to perform the dual action of selecting and submitting a displayed autocompletion string with a single selection action, such as a single (or double) mouse click, a single (or double) tap on the string with a stylus, or a voice command. In one embodiment, for example, if the user taps or clicks once on a suggested string (term or phrase), the string is automatically added to the search field 60; and if the user taps or clicks twice on a string, the string is automatically submitted as the search query. In another embodiment, tapping or clicking once on a string causes the string to be submitted as the search query. In either case, the user can advantageously initiate the search without moving the stylus or mouse cursor away from the selected string. In embodiments that support voice recognition, each suggested string may be displayed in conjunction with a number (1, 2, 3, . . .) that can be used as a voice command to perform the dual action of selecting the string and initiating the search.

Many search engines allow the user to specify a particular context for performing the search. The context may, for example, be a particular item category (e.g., books, music, or electronics), a particular record field (e.g., title, artist, or subject), or a combination thereof. In such cases, the autocompletion strings suggested to the user may depend upon the particular context designated by the user. For example, when the user conducts a title search for books, the autocompletion strings may be limited to terms and phrases that appear within book titles, or that have appeared in book title searches conducted by other users.

FIG. 3 illustrates the general form and content of a trie data structure 30 that may be used for the storage and lookup of autocompletion strings. The leaf nodes of the trie represent autocompletion phrases, and are preferably stored together with respective scores (shown in parenthesis). Autocompletion terms may be represented within the trie either as leaf nodes or as intermediate nodes, and are likewise preferably stored with respective scores. Although only alphabetical characters are shown, the trie may also include numeric and/or other types of characters that commonly occur within search queries for the particular system. In operation, each time the user enters a character of the search query, the autocompletion client 50 effectively moves down the trie by one level to a node that matches the entered characters, and then searches the nodes falling below that node for the X terms having the highest scores and Y phrases having the highest scores, where X and Y are the maximum numbers of terms and phrases, respectively, to be displayed at a time. The located terms and phrases, if any, are then displayed to the user as in FIG. 2.

In embodiments in which the suggested strings depend upon the search context, the terms and phrases may be tagged within the trie to indicate the contexts to which they correspond. For example, nodes containing the term SONY may be tagged to indicate that they correspond to the item category "electronics." The autocompletion client 50 uses these tags to effectively filter out nodes that do not correspond to the context of the user's search.

Each score within the trie reflects an estimated probability or prediction that the user is entering the corresponding string. The scores are preferably based on at least one of the following: (a) the frequency with which the string has appeared within search queries of users over a selected period of time, optionally giving more weight to searches that are deemed "successful," (b) the sales ranks or other popularity ranks of the item(s) to which the string corresponds, and (c) the frequency of occurrence of the string within the database 22.

Prior to transmitting the trie to a given user, the scores may optionally be adjusted based on information known about the particular user. For example, if the user has shown a strong affinity for electronics products over other types of products within the database 22, all of the scores associated with strings corresponding to the electronics items may be multiplied by an appropriate scaling factor. The string content of the trie may similarly be customized to the user, such as by deleting nodes that correspond only to item categories for which the user has shown no interest. As discussed below, another customization method that may be used involves generating community-specific datasets 30 that correspond to the activities (e.g., query submissions) or interests (e.g., purchases) of particular communities or user groups.

Another type of data structure that could be used for autocompletion is a related terms table of the type described in above-referenced U.S. Pat. No. 6,006,225. Each entry in the related terms table includes two components: (1) a keyword, and (2) a "related terms" list, which is preferably a ranked list of the X terms that have occurred the most frequently in multi-term search queries that included the keyword. For example, the related terms list for the keyword COSMOS might start with the terms SAGAN and SPACE, indicating that SAGAN has occurred the most frequently, and SPACE has occurred the second most frequently, in searches that included the term COSMOS. With this type of data structure, once the user has entered a term that appears as a keyword within the table, the autocompletion client 50 could simply suggest adding the most highly ranked terms in the corresponding related terms list. If the user begins entering characters of the second term of the query, the client could then filter out from the list the terms that no longer apply, and display any remaining terms in their ranked order.

FIGS. 4 and 5 illustrate an embodiment of the FIG. 1 system in which the autocompletion datasets 30 are generated using information stored within a query log 76 of an online merchant, such as Amazon.com. The information contained within the query log that may be used in the dataset generation process preferably includes the following: (a) the query and search context of each search, (b) an identifier of the user who performed the search, (c) the number of hits (items found) by the search, (d) whether any of the query terms were modified by a query spell checker component, and (e) the time the search was performed. The query log 76 also preferably includes information that may be used to determine whether the user viewed, purchased, or added to a shopping cart a search result item. Techniques for processing query logs to extract such information are described, for example, in published international patent application WO 99/45487, assigned to Amazon.com, Inc., the disclosure of which is hereby incorporated by reference.

FIG. 5 illustrates the basic method used by the string extraction component 46 ("process") to generate one or more autocompletion datasets 30 from the query log 76. In state 80, the process obtains the query log data for the most recent M days (e.g. one week). Limiting the query log data in this manner has the desirable effect of producing a dataset that strongly reflects the current item interests of users. In state 82, the process filters out all query submissions that produced a null query result or required use of a query spell checker. Other types of searches that may be filtered out include searches that produced very large numbers of hits, and searches for which the user did not view any of the search results. To preserve search context information, each remaining query may be appended with a code that identifies the context of the search.

In state 84, the process optionally partitions the remaining query log data according to predefined user groups. This may be accomplished, for example, using information stored in the customer database 78 (FIG. 4) to identify the community or communities to which each user belongs. Alternatively, each user's community membership may be recorded within a cookie on the user's device 40, and inserted into the query log 76 when a search is performed. The partitions may, for example, be based on the domiciles of the users, as reflected in user shipping addresses. With this approach, a user living in Southern California that types in HOLLYWOOD may see autocompletion phrases related to Hollywood California, while a user living in South Florida who enters the same characters may see autocompletion phrases related to Hollywood Fla. This feature is particularly helpful when the user is searching for a book or other item of local interest.

The partitions may alternatively be based on email domains (e.g., all users within the Microsoft.com domain), or on explicit membership information entered by users. Examples of types of communities that may be used to implement this feature are described in U.S. application Ser. No. 09/377,447 of Amazon.com, Inc., filed Aug. 19, 1999, the disclosure of which is hereby incorporated by reference. As depicted in FIG. 5, if the log data is partitioned according to user groups, the remaining states 86 and 88 are performed once for each such group. Otherwise, states 86 and 88 are performed only once.

In state 86, the process identifies and assigns scores to the most frequently used terms and phrases, excluding common stop words. This may be accomplished, for example, by counting the number of times each word or phrase appears within the relevant log data. Query submissions that produced successful results, such as an item viewing event or item purchase, may be given greater weight (e.g., counted more than once) during the counting process. The final count values may be normalized to produce the scores. Examples of specific algorithms that may be used to implement state 86 are described in U.S. Prov. Appl. No. 60/170,151, filed Dec. 10, 1999, and U.S. Pat. No. 6,006,225, both assigned to Amazon.com Inc., the disclosures of which are hereby incorporated by reference.

In state 88, the resulting strings and score values are stored within a trie search tree or other data structure 30 for subsequent transmission to users. Where geographic regions or other user groups are used, the datasets are transmitted to users based on the respective user groups to which they belong.

An important benefit of the FIG. 5 method is that the resulting datasets tend to reflect, and thus direct users to, the most popular items within the database. Further, where the log data is partitioned according to user groups, the datasets favor the items that are the most popular within such groups.

FIG. 6 illustrates an alternative method in which the autocompletion strings are extracted from item descriptions (records) within the database 22. As mentioned above, the descriptions could alternatively be obtained for some other source, such as manufacturers' databases. In state 92, the purchase histories for the last X days (e.g., two months) of all users are obtained from a customer database 78. In state 94, the purchase histories are optionally partitioned according to geographic region or other user group. In state 96, the purchase history data is processed to identify the Y best selling items, where Y may be selected as a fixed percentage of the total number of items in the database 22. In state 98, the database records of the best selling items are processed to extract characterizing terms and/or phrases. For autocompletion phrases the item names can simply be used, using string truncation where the names are too long. For autocompletion terms, an algorithm may be used that gives greater weight to terms that appear less frequently within the database 22. Scores may be assigned to the extracted stings based on the sales ranks of the items, the uniqueness of the strings, and/or some other criteria. The remaining states of the method are the same as in FIG. 5.

Although the autocompletion strings are preferably extracted automatically, some or all of the strings could be generated manually by a system administrator. This may be desirable, for example, when newly released items have been added to the database 22 that are not yet generally known to new users. For example, when a musical group releases a new album, the online merchant may wish to manually insert a string which causes the album name and release date to be displayed when the group's name is typed in. It may also be desirable to manually or automatically adjust the datasets to achieve a desired business objective, such as to favor items or item categories for which an inventory surplus exists.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims that follow.

What is claimed is:

1. A method of assisting users in generating queries for submission to a query server of a database access system, comprising:

generating a dataset that contains autocompletion strings for the query server, wherein the autocompletion strings are selected based on attributes of the database access system;

transmitting the dataset to a remote computing device of a user of the database access system; and on the remote computing device, suggesting autocompletion strings to the user from the dataset as the user enters a query for submission to the query server;

wherein the dataset is generated remotely from the remote computing device.

2. The method as in claim 1, wherein the computing device is a wireless device that lacks a full keyboard.

3. The method as in claim 1, wherein the attributes comprise a history of query submissions submitted to the query server by a plurality of users.

4. The method as in claim 3, wherein generating the dataset comprises extracting the autocompletion strings from a query log that reflects query submissions from each of a plurality of user computing devices.

5. The method as in claim 4, wherein extracting the autocompletion strings from the query log comprises selecting search terms and/or search phrases from the query log based at least upon frequency of submission.

6. The method as in claim 4, wherein extracting the autocompletion strings from the query log comprises ignoring query submissions that produced a null query result.

7. The method as in claim 4, wherein extracting the autocompletion strings from the query log comprises extracting the strings from a most recent set of the query log data so that the autocompletion strings reflect current interest of users.

8. The method as in claim 1, wherein the attributes comprise items stored within a database of the database access system.

9. The method as in claim 8, wherein generating the dataset comprises extracting the autocompletion strings from item descriptions within the database.

10. The method as in claim 8, wherein generating the dataset comprises identifying a subset of the items within the database based on selected criteria, and extracting the autocompletion strings from item descriptions of the subset of items.

11. The method as in claim 1, wherein generating a dataset that contains autocompletion strings comprises generating a plurality of datasets, wherein each dataset corresponds to a different group of users, and wherein the method further comprises transmitting the datasets to users based on group memberships.

12. The method as in claim 11, wherein generating the plurality of datasets comprises generating datasets for each of a plurality of geographic regions based at least in part on activities of users within such regions.

13. The method as in claim 1, further comprising customizing the dataset to the user prior to transmission to the computing device.

14. The method as in claim 1, further comprising submitting a suggested autocompletion string to the query server in response to the user performing a single selection action with respect to the string, without requiring the user to perform an additional action.

15. The method as in claim 1, wherein suggesting the autocompletion strings to the user comprises selecting autocompletion strings to display based at least upon a search context specified by the user.

16. The method as in claim 1, wherein transmitting the dataset to a remote computing device comprises transmitting at least a portion of the dataset with a corresponding search page.

17. The method as in claim 1, wherein suggesting autocompletion strings to the user comprises suggesting the autocompletion strings as the user enters a query by voice.

18. The method of claim 1, further comprising transmitting the dataset to each of a plurality of additional remote computing devices, and on each of the additional remote computing devices, suggesting autocompletion strings from the dataset to a user during search query entry.

19. A search engine system that embodies the method of claim 1.

20. A system for assisting users in generating search queries for submission to a query server of a database access system, comprising:

a first component that extracts autocompletion strings from at least one of the following sources (a) a log of queries submitted to the query server by a plurality of users, and (b) descriptions of items stored within a database of the database access system;

a second component that dispatches the autocompletion strings extracted by the first component to computing devices of users of the database access system; and a third component that runs on the computing devices and suggests the autocompletion strings to users as the users enter search queries for submission to the query server of the database access system.

21. The system as in claim 20, wherein the third component runs on a wireless computing device that lacks a full keyboard.

22. The system as in claim 21, wherein the third component suggests autocompletion strings in response to entry of queries by voice.

23. The system as in claim 20, wherein the first component extracts the autocompletion strings so as to generally favor the most popular items within the database.

24. The system as in claim 20, wherein the first component extracts query strings from the query log based at least upon frequency of string submission.

25. The system as in claim 20, wherein the first component extracts autocompletion strings from descriptions of items within the database based at least upon item popularity data.

26. The system as in claim 20, wherein the first component extracts the autocompletion strings periodically based at least upon a most recent set of user activity data.

27. The system as in claim 20, wherein the first component generates customized datasets of autocompletion strings for each of a plurality of subsets of a population of users.

28. The system as in claim 20, wherein the second component transmits at least some of the extracted autocompletion strings to computing devices with a search page to which the autocompletion strings correspond.

29. The system as in claim 20, wherein the third component automatically submits a suggested autocompletion string to the query server in response to a user performing a single selection action with respect to the string, without requiring the user to perform a further action.

30. A method of assisting a user in generating a query to submit to a query server, comprising, on a computing device:

retrieving a dataset of autocompletion strings from a server, wherein at least a portion of the dataset corresponds to the query server;

storing the dataset in a memory of the computing device; and in response to entry by a user of a search query for submission to the query server, suggesting autocompletion strings from the dataset to the user.

31. The method as in claim 30, wherein the dataset is retrieved in response to user retrieval of a search page that corresponds to the query server.

32. The method as in claim 30, wherein the computing device is a wireless device that lacks a full keyboard.

33. The method as in claim 30, wherein the autocompletion strings are suggested in response to voice entry by the user of the search query.

34. The method as in claim 30, further comprising transmitting a suggested autocompletion string to the query server in response to the user performing a single selection action with respect to the string, without requiring the user to perform a further action.

35. The method as in claim 34, wherein the single selection action is one of the following: (a) clicking once on the suggested string, (b) tapping once on the suggested string, (c) clicking twice on the suggested string, or (d) tapping twice on the suggested string.

36. The method as in claim 30, wherein suggesting autocompletion strings comprises selecting strings from the dataset based at least upon a search context specified by the user.

37. An autocompletion client component that embodies the method of claim 30.

38. A search engine system, comprising:

a multi-user query processing system that maintains a log of search queries submitted by users of the query processing system, said search queries including search strings;

a first component that analyses the log to identify search strings that are deemed to be useful as search query autocompletion strings, and which incorporates selected search strings into a dataset of autocompletion strings; and a second component that monitors entry by a user of a search query, and during said entry, suggests corresponding autocompletion strings to the user from the dataset of autocompletion strings to assist the user in entering the search query.

39. The search engine system as in claim 38, wherein the second component runs on a user computing device, remotely from the first component.

40. The search engine system as in claim 38, wherein the second component is adapted to run on a wireless computing device, and is adapted to received the dataset of autocompletion strings from a server over a wireless link.

41. The search engine system as in claim 38, wherein the first component implements a search string scoring algorithm to assign scores to search strings.

42. The search engine system as in claim 41, wherein the search string scoring algorithm scores a search string based at least in-part upon a frequency with which the search string has been submitted by users over a selected period of time.

43. The search engine system as in claim 41, wherein the search string scoring algorithm scores a search string based at least in-part upon post-query-submission actions performed by users who submitted the search string, said post-query-submission actions comprising user actions performed with respect to search result items.

44. The search engine system as in claim 41, wherein the first component incorporates scores generated by the search string scoring algorithm into the dataset, and second component uses the scores to select autocompletion strings from the dataset to suggest.

45. The search engine system as in claim 38, wherein the first component incorporates search context information into dataset, and the second component uses the search context information to select autocompletion strings that correspond to a search context of the search query.

46. The search engine system as in claim 38, wherein the first component additionally incorporates into the dataset autocompletion strings selected from searchable items.

47. A method of facilitating the formulation of search queries, the method comprising:

maintaining a log of search queries submitted to a multi-user query server by users thereof, said search queries including search strings;

selecting a plurality of the search strings from the log based on search string selection criteria;

incorporating the plurality of search strings into a dataset of autocompletion strings; and dispatching the dataset of autocompletion strings to each of a plurality of user devices that are adapted to suggest autocompletion strings therefrom to users during entry of search queries.

48. The method claim 47 wherein the plurality of search strings are selected based at least in-part upon relative frequencies of search string submission.

49. The method of claim 47, wherein the plurality of search strings are selected based at least in-part upon numbers of search result items produced by corresponding searches.

50. The method of claim 47, wherein the plurality of search strings are selected based at least in-part upon an analysis of post-query-submission user actions performed with respect to items located by corresponding search queries.

51. The method of claim 47, wherein dispatching the dataset of autocompletion strings to each of a plurality of user devices comprises transmitting the dataset over a wireless link to at least one user device.

52. The method of claim 47, wherein dispatching the dataset of autocompletion strings comprises sending the dataset to a user device with a corresponding search page.

53. The method of claim 47, wherein the log includes queries submissions from each of a plurality of user computing devices.

54. A method of facilitating user searches of a database, comprising:

transmitting a search page from a server to a computing device of a user together with an associated dataset of autocompletion strings, said search page including a field for entering a search query for submission to a query server;

on the computing device, monitoring entry by the user of a search query into the field of the search page; and during said entry of the search query, suggesting at least one autocompletion string of the dataset to the user to assist the user, in completing the search query.

55. The method of claim 54, further comprising generating the dataset at least in-part by selecting search strings from a record of search queries submitted by users of the query server.

56. The method of claim 54, further comprising, in response to selection by the user of a suggested autocompletion string, submitting the autocompletion string to the query server without requiring further user action, whereby the user can both select an autocompletion string and submit a search query with a single selection action.

* * * * *